(12) United States Patent
Marchione

(10) Patent No.: US 11,738,401 B2
(45) Date of Patent: Aug. 29, 2023

(54) METHOD FOR MANUFACTURING T-SHAPED STRUCTURES

(71) Applicant: Caterpillar Inc., Peoria, IL (US)

(72) Inventor: Thierry Marchione, Heber, UT (US)

(73) Assignee: Caterpillar Inc., Peoria, IL (US)

( * ) Notice: Subject to any disclaimer, the term of this patent is extended or adjusted under 35 U.S.C. 154(b) by 375 days.

(21) Appl. No.: 16/680,600

(22) Filed: Nov. 12, 2019

(65) Prior Publication Data

US 2021/0138569 A1    May 13, 2021

(51) Int. Cl.
*B23K 9/04* (2006.01)
*B33Y 10/00* (2015.01)
*B33Y 80/00* (2015.01)

(52) U.S. Cl.
CPC ............... *B23K 9/044* (2013.01); *B33Y 10/00* (2014.12); *B33Y 80/00* (2014.12)

(58) Field of Classification Search
CPC ............... B22F 7/04; B22F 7/062; B22F 7/08
See application file for complete search history.

(56) References Cited

U.S. PATENT DOCUMENTS

| | | | | |
|---|---|---|---|---|
| 4,903,888 A | * | 2/1990 | Clark | B23K 26/32 |
| | | | | 219/121.45 |
| 4,907,734 A | * | 3/1990 | Conru | B23K 20/023 |
| | | | | 228/123.1 |
| 5,202,546 A | * | 4/1993 | Nakayama | B23K 9/0216 |
| | | | | 219/137 R |
| 7,005,607 B2 | * | 2/2006 | Takatani | B23K 33/00 |
| | | | | 219/124.34 |
| 8,283,599 B2 | * | 10/2012 | Nakajima | B23K 9/025 |
| | | | | 219/137 R |
| 9,044,818 B2 | * | 6/2015 | O'Donnell | B23K 9/025 |
| 10,717,483 B2 | * | 7/2020 | Ohishi | B62D 55/28 |
| 2011/0073579 A1 | * | 3/2011 | Artelsmair | B23K 9/04 |
| | | | | 219/137 R |
| 2015/0021379 A1 | | 1/2015 | Albrecht | |
| 2015/0083710 A1 | * | 3/2015 | Albrecht | B23K 26/60 |
| | | | | 219/601 |
| 2017/0008114 A1 | | 1/2017 | Langham et al. | |
| 2018/0029158 A1 | * | 2/2018 | Bray | B23K 33/006 |
| 2019/0128144 A1 | * | 5/2019 | Vargas | B23P 6/007 |
| 2020/0324356 A1 | * | 10/2020 | Yamasaki | B22F 12/41 |
| 2021/0086279 A1 | * | 3/2021 | Clover | B23K 9/04 |

FOREIGN PATENT DOCUMENTS

| | | |
|---|---|---|
| CN | 106808062 A | 6/2017 |
| CN | 108637504 A | 10/2018 |
| CN | 108941858 A | 12/2018 |

* cited by examiner

*Primary Examiner* — Jacob J Cigna

(57) ABSTRACT

A method for manufacturing a T-shaped structure includes depositing one or more layers of weld beads over a portion of a surface of a first component such that the one or more layers of weld beads develop a metallurgical bond with the portion. Also, the method includes placing an end of a second component over the one or more layers of weld beads such that the end develops a metallurgical bond with the one or more layers of weld beads. The one or more layers of weld beads define a fully penetrated weld joint between the end and the portion to form the T-shaped structure.

11 Claims, 9 Drawing Sheets

METHOD FOR MANUFACTURING T-SHAPED STRUCTURES

TECHNICAL FIELD

The present disclosure relates to manufacturing T-shaped structures by a welding process. More particularly, the present disclosure relates to a method for manufacturing a T-shaped structure by way of deploying two components in a T-shaped configuration and by causing weld beads, deposited during the welding process, to fully penetrate into an interface defined between the two components.

BACKGROUND

T-shaped structures are used in a wide range of applications. For example, in the construction industry, T-shaped brackets may be used to connect two adjoining panels to each other, to reinforce various structural layouts in the construction industry, etc. Among the many methods of manufacturing T-shaped structures, one method includes bringing forth two components together into a T-shaped configuration, and, thereafter, welding the two components together at an interface where one component abuts or contacts the other component. Such welding may be performed by introducing a filler material at the interface that forms a weld joint at the interface.

Arduous working conditions require such weld joints to possess a minimum strength. A strength of such weld joints depends upon several weld parameters. As an example, one weld parameter may relate to the extent to which an associated welding process may be able to minimize the formation of gaps within the filler material and between the filler material and the interface may be detrimental to the strength of the weld joint. This is because excessive gap formation may alter the mechanical and fatigue properties of the weld joint and may cause the weld joint to exhibit a below desirable weld strength.

U.S. Publication No. 20150021379 discloses an additive manufacturing system for joining first and second work pieces. The additive manufacturing system includes an additive manufacturing tool configured to receive a plurality of metallic anchoring materials, melt the plurality of metallic anchoring materials to form a plurality of droplets, and deposit the plurality of droplets between the first and second work pieces to join them together.

SUMMARY OF THE INVENTION

In an aspect, the present disclosure relates to a method for manufacturing a T-shaped structure. The method includes depositing one or more layers of weld beads over a portion of a surface of a first component such that the one or more layers of weld beads develop a metallurgical bond with the portion. Also, the method includes placing an end of a second component over the one or more layers of weld beads such that the end develops a metallurgical bond with the one or more layers of weld beads. The one or more layers of weld beads define a fully penetrated weld joint between the end and the portion to form the T-shaped structure.

In another aspect, the present disclosure is directed to a T-shaped structure. The T-shaped structure may be manufactured by a process that includes depositing one or more layers of weld beads over a portion of a surface of a first component such that the one or more layers of weld beads develop a metallurgical bond with the portion. Also, the process includes placing an end of a second component over the one or more layers of weld beads such that the end develops a metallurgical bond with the one or more layers of weld beads. The one or more layers of weld beads define a fully penetrated weld joint between the end and the portion to form the T-shaped structure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
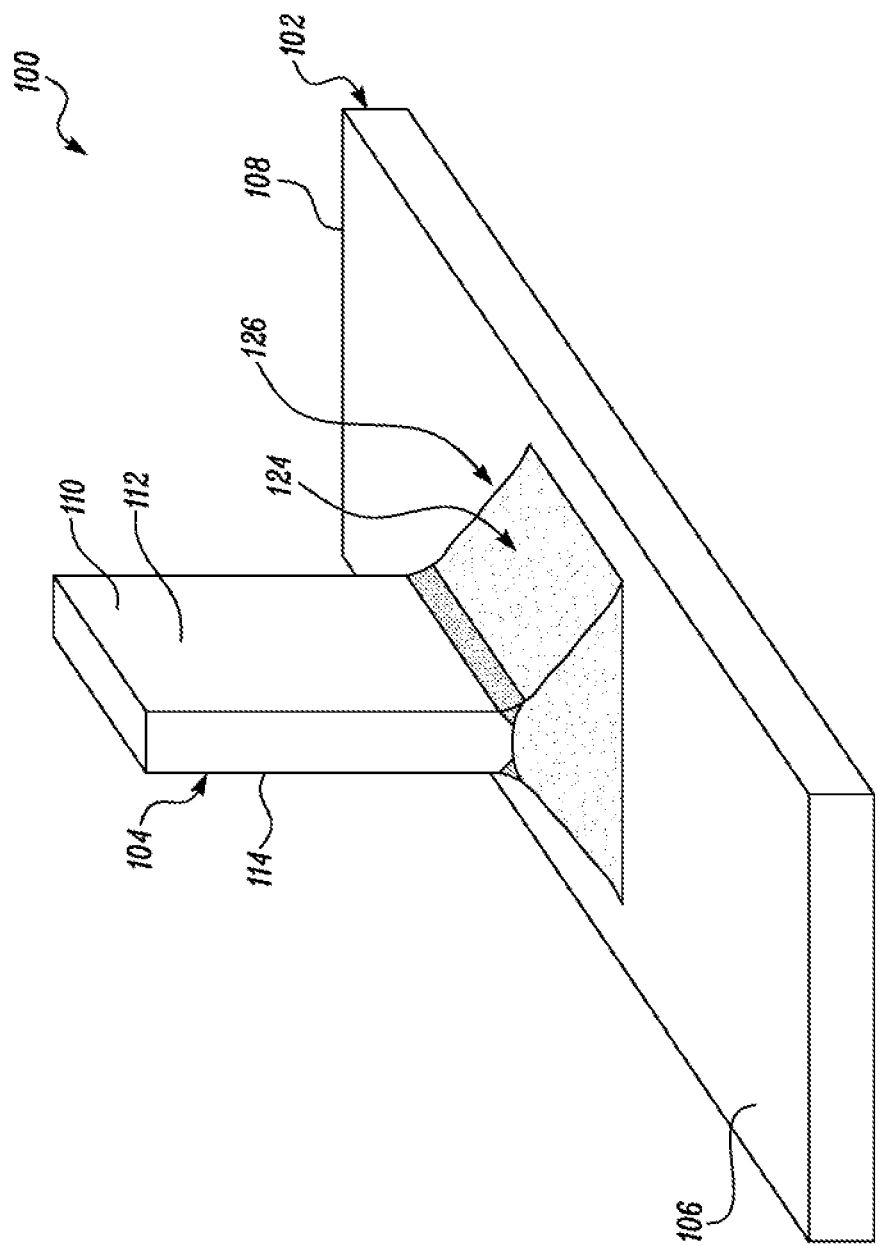
FIG. 1 is a perspective view of a T-shaped structure, in accordance with an embodiment of the present disclosure.
Figure 2:
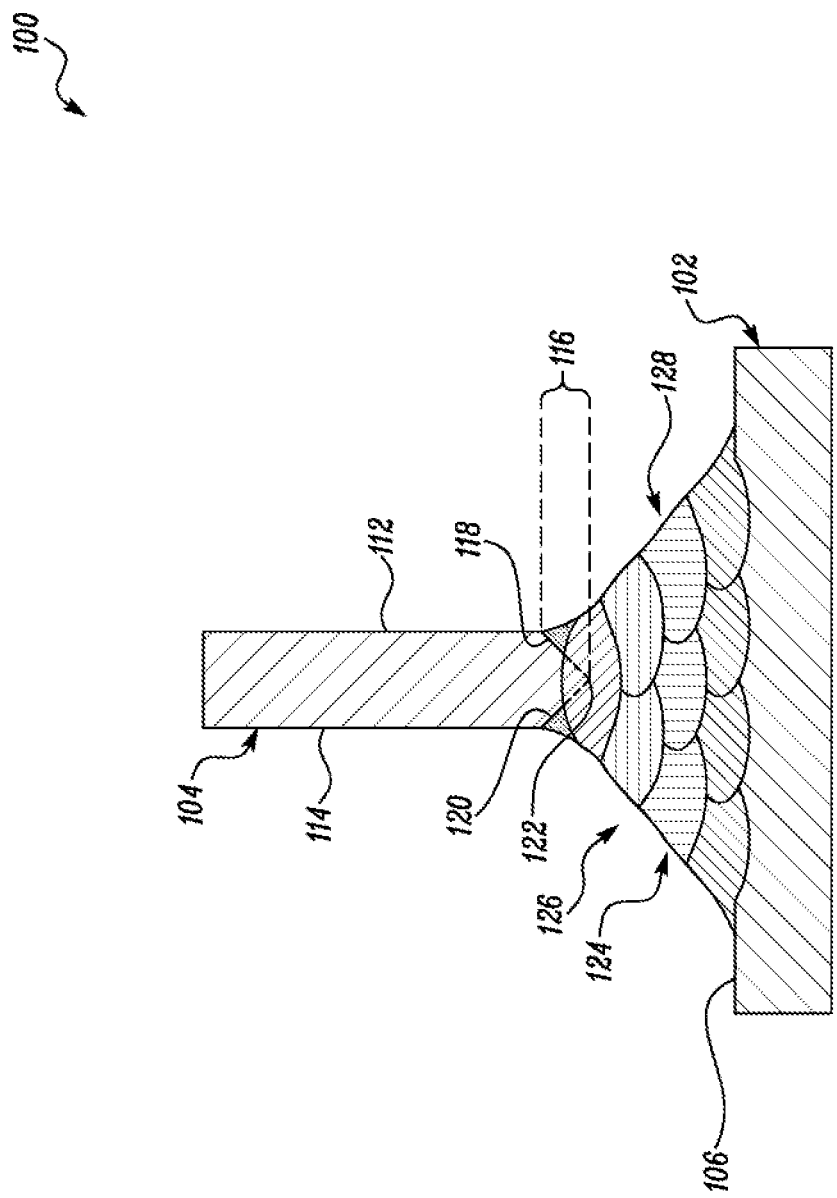
FIG. 2 is a cross-sectional view of the T-shaped structure, in accordance with an embodiment of the present disclosure.

Referring to FIGS. 1 and 2, a T-shaped structure 100 is illustrated. The T-shaped structure 100 may be applied in joining different structures to one another or may be used to reinforce any existing structure. Alternatively, the T-shaped structure 100 may be utilized as a bracket to mount one structure over another. Apart from the already disclosed applications and uses, several other applications of the T-shaped structure 100, in a myriad of environments, may be contemplated. The T-shaped structure 100 may be formed by two components, i.e., a first component 102 and a second component 104.

In the illustrated embodiment, the first component 102 and the second component 104 may be cuboidal in shape, each having a total of six side surfaces—for example, six planar side surfaces, as shown, and may correspondingly resemble plates. The first component 102 and the second component 104 may have different dimensions, as may be suggestive in the illustrations provided in FIGS. 1 and 2. However, in some embodiments, the components 102, 104 may be identical to each other.

In detail, the first component 102 may be formed into the shape of a flat plate defining a surface 106 on to which the second component 104 may be mounted and coupled to, so as to form the T-shaped structure 100. In so doing, the first component 102 may form a crossbar portion 108 of the T-shaped structure, while the second component 104 may form a stem 110 of the T-shaped structure 100 that extends generally midway from the crossbar portion 108. As with the first component 102, the second component 104 may be formed into the shape of a flat plate defining a first side surface 112 and a second side surface 114. The first side surface 112 is opposed to the second side surface 114, as shown, and both may extend in the same direction to define an end 116 of the second component 104 (as shown in FIG. 2). In some embodiments, the first side surface 112 and the second side surface 114 may be parallel to each other, while, in some other embodiments, the first side surface 112 and the second side surface 114 may be non-parallel to each other.

Referring to FIG. 2, the end 116 defines a first beveled surface 118 and a second beveled surface 120. In an embodiment, the first beveled surface 118 extends from the first side surface 112, and the second beveled surface 120 extends from the second side surface 114 towards the first beveled surface 118. The first beveled surface 118 and the second beveled surface 120 may converge towards each other to meet each other at an edge 122 of the end 116. The edge 122 may be a relatively sharp edge, and/or may be defined linearly and may extend parallelly to and along the one or more of the first side surface 112 and/or the second side surface 114. For example, the edge 122 may be equidistant from the first side surface 112 and the second side surface 114. In some embodiments, the first beveled surface 118 may define a bevel angle 'α' of up to or equal to 45 degrees with respect to the first side surface 112 of the second component 104 (shown in FIG. 6). Similarly, the second beveled surface 120 may define a bevel angle 'β' of up to or equal to 45 degrees with respect to the second side surface 114 of the second component 104 (shown in FIG. 6).

In some embodiments, only one of first beveled surface 118 or the second beveled surface 120 may be defined at the end 116. Assuming that the first beveled surface 118 were solely present at the end 116, said first beveled surface 118 may extend from the first side surface 112 all the way up to the second side surface 114, such that an edge (similar to the edge 122) may be defined where the first beveled surface 118 may meet the second side surface 114.

Each of the first component 102 and the second component 104 may be composed of a metal, including, but not limited to, iron, steel, aluminum, or any other metal, or any alloys thereof. Also, each of the first component 102 and the second component 104 may embody variety of shapes, contours, profiles, bodies, structures, or combinations thereof, other than the ones illustrated, to suitably form the T-shaped structure 100. For example, the first component 102 and the second component 104 may include one or more of arcuate, cylindrical, concave, convex, and/or incurvate profiles, or shapes, at one or more regions, to impart a contoured configuration to the components 102, 104—and thus, the planar surfaces, i.e., surfaces 106, 112, and 114, or the cuboidal shapes of the first component 102 and the second component 104 need to be seen as being purely exemplary.

According to one aspect of the present disclosure, the first component 102 and the second component 104 may be joined to each other by a weld joint 124, e.g., a fully penetrated weld joint 124 to form the T-shaped structure 100. For example, the weld joint 124 may be disposed at an interface 126 defined between the first component 102 and the second component 104. Given the fully penetrated weld joint 124 at the interface 126, said interface 126 may be defined as a fully penetrated weld joint interface 126. Further, although the disclosed embodiments discuss two components forming the T-shaped structure 100, it may be contemplated that the T-shaped structure 100 may include any number of components joined or clubbed together to form the T-shaped structure.

Referring to FIGS. 3 to 9, an exemplary process or a method 300 for joining the first component 102 and the second component 104 to manufacture the T-shaped structure 100, is disclosed. Said method will be discussed now.

Figure 3:
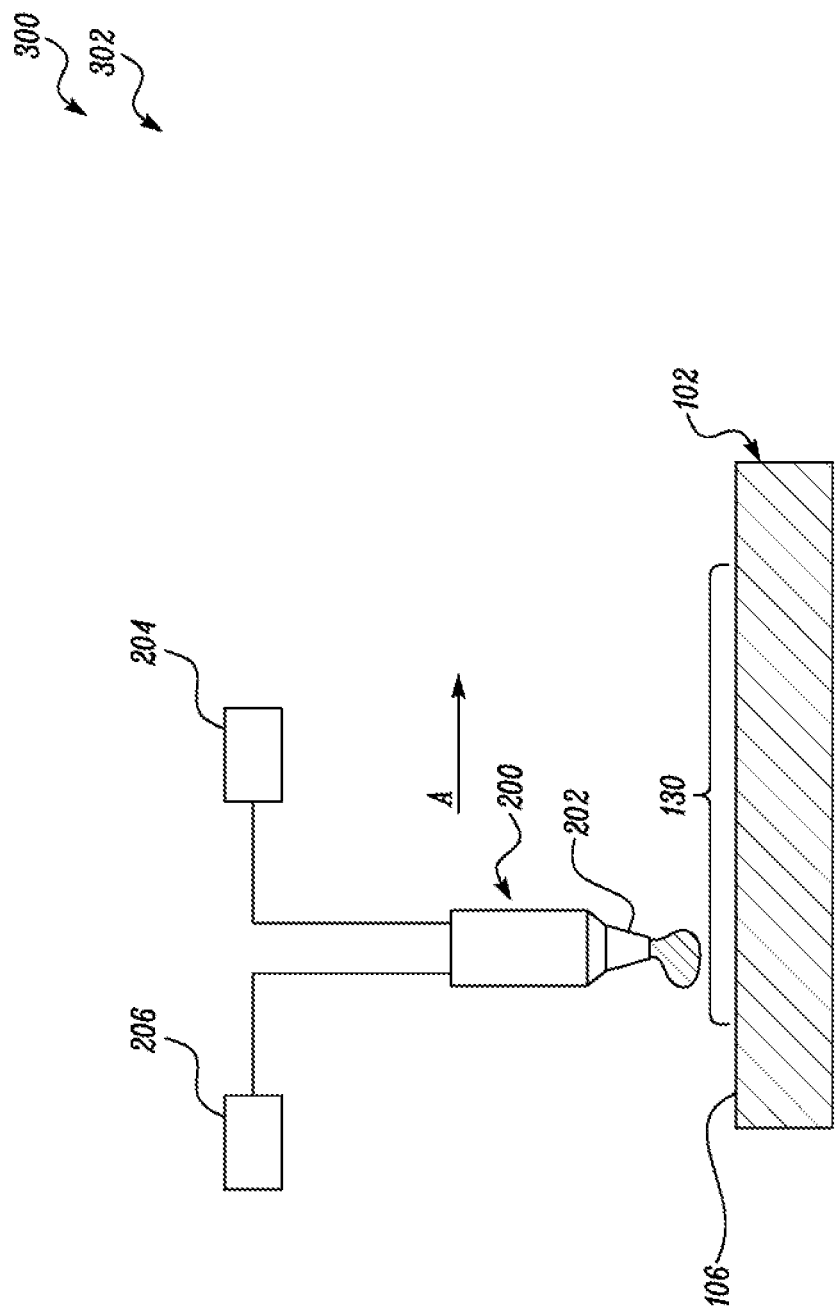
FIGS. 3 to 9 illustrate a method for manufacturing the T-shaped structure, in accordance with an embodiment of the present disclosure.
Figure 4:
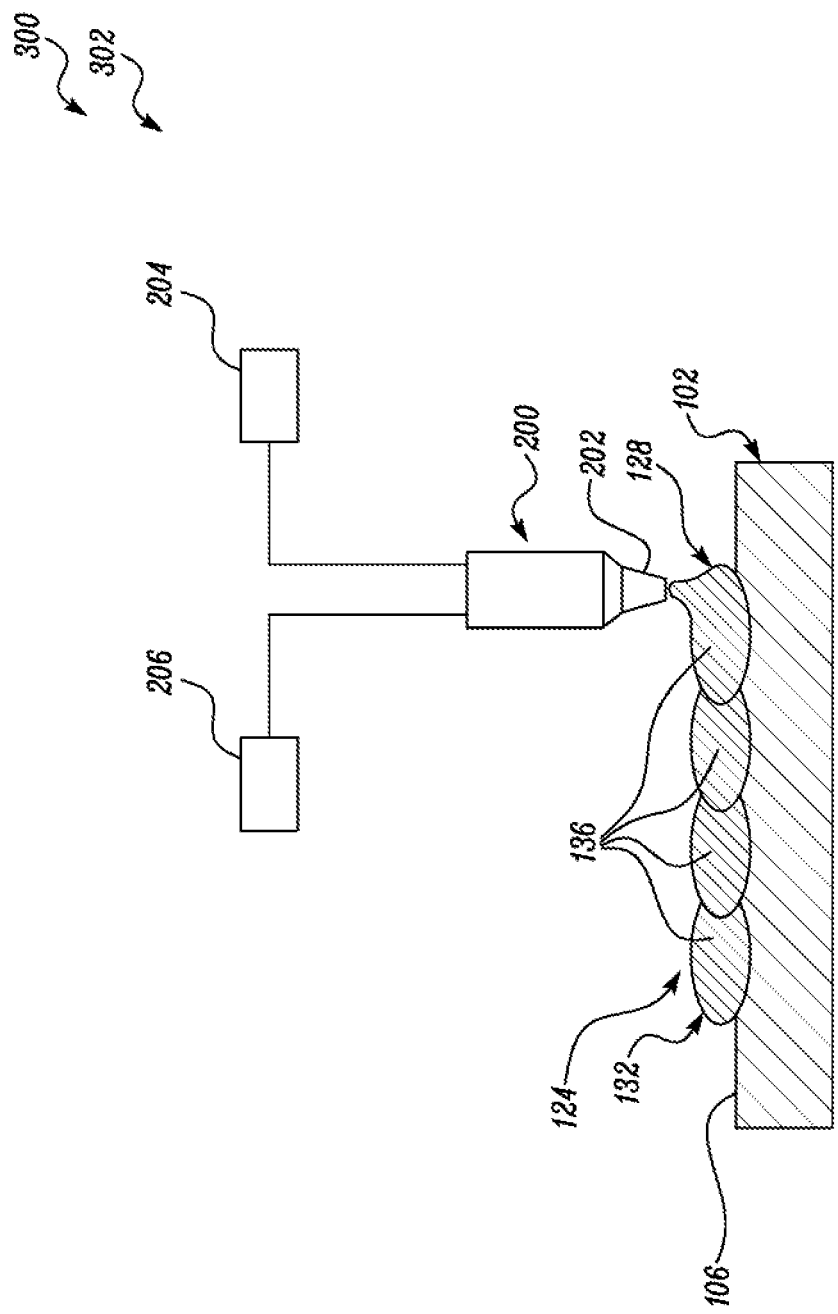
Figure 5:
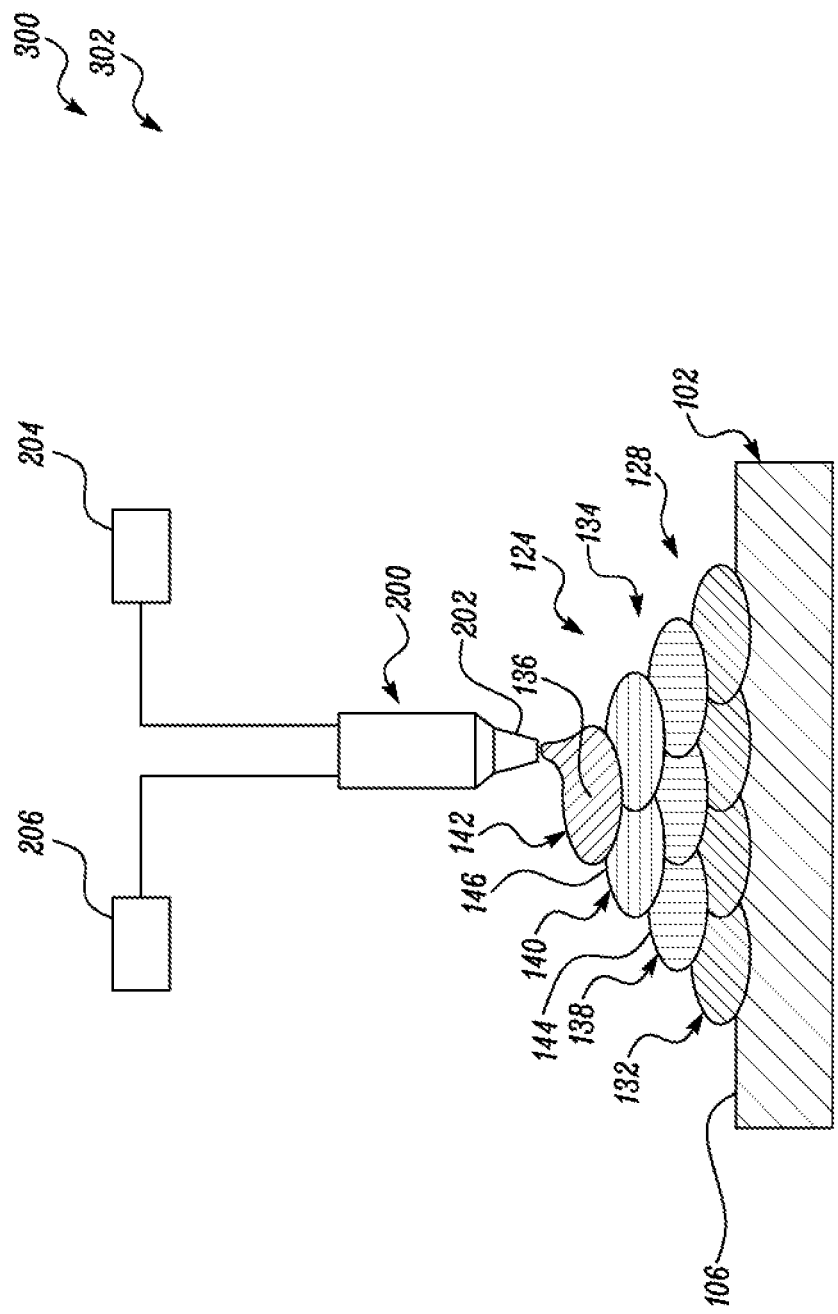

Referring to FIGS. 3, 4 and 5, at step 302, the first component 102 may be placed on a support, e.g., a horizontal support (not shown), such that the surface 106 is revealed, e.g., to the top, away from the support. Thereafter, one or more layers 128 of weld beads may be deposited over a portion 130 (see FIG. 3) of the surface 106. Depositing the one or more layers 128 of weld beads may include depositing a base layer 132 of weld beads and further successively depositing one or more additional layers 134 (shown in FIG. 5) of weld beads over the already deposited, base layer 132.

Also, each of the base layer 132 and the additional layers 134 of weld beads may include one or more weld beads 136. In some embodiments, the deposition of the layers 128 of weld beads may not be limited to the portion 130 but may be extended over an entirety of the surface 106.

In some embodiments, the layers 128 of weld beads are deposited by using wire-arc additive manufacturing. For the purposes of the present disclosure, the term "wire-arc additive manufacturing" (hereinafter, referred to as "WAAM), includes any additive manufacturing process wherein a metal welding wire (feedstock) is melted using an electric arc (heat source) and deposited in the form of weld beads over a base component (substrate) to form a layer of metal material. The wire-arc additive manufacturing may be performed by adopting one or more of shielded metal arc welding (SMAW), gas tungsten arc welding (GTAW), tungsten inert gas welding (TIG), gas metal arc welding (GMAW), and/or metal inert gas welding (MIG).

In this regard, a wire-arc additive manufacturing system 200 may be utilized for depositing the layers 128 of weld beads. Exemplarily, the wire-arc additive manufacturing system 200 may include a welding nozzle 202, a wire delivery unit (e.g. a wire feeder) 204, and an energy supply unit 206. The energy supply unit 206 may include an electric power output unit, a photonic energy output unit (e.g. laser), or any suitable energy supply unit. The wire delivery unit 204 may draw wires from wire sources such as spools, reels, containers, etc., to supply the wires to the welding nozzle 202. The welding nozzle 202 may be configured to receive the wires from the wire delivery unit 204, may melt the wires by utilizing energy supplied by the energy supply unit 206, and may deposit the melted wires as weld beads 136 on to the portion 130, thereby forming the layers 128 of weld beads on the portion 130. Such a system may be well known and/or contemplated by someone in the art, and will accordingly not be discussed any further.

The base layer 132 of weld beads may be deposited by continuously laying the weld beads 136 over the portion 130. For example, the base layer 132 of weld beads may be deposited by continuously laying four weld beads 136 either simultaneously or in quick succession along the direction 'A' (see FIGS. 3 and 4). i.e., one after the other—a higher or a lower number of weld beads may be contemplated. The weld beads 136 may be laid over the portion 130 such that each weld bead may develop a metallurgical bond with an adjacent weld bead. Also, the weld beads 136 may be laid continuously or in quick succession over the portion 130 such that the base layer 132 of the weld beads may fuse with the portion 130. In process of depositing the base layer 132, the portion 130 may partially melt owing to the relatively heightened temperatures of the associated deposition process, assisting the base layer 132 to develop a metallurgical bond with the first component 102.

Referring to FIG. 5, the one or more additional layers 134 of weld beads may be deposited over the base layer 132 of weld beads. In the illustrated embodiment, the one or more additional layers 134 of weld beads include a first additional layer 138 of weld beads, a second additional layer 140 of weld beads, and a third additional layer 142 of weld beads. In some embodiments, the one or more additional layers 134 of weld beads may include any suitable higher or lower number of additional layers of weld beads. Similar to the base layer 132, each of the first additional layer 138, the second additional layer 140, and the third additional layer 142 may be formed by laying the one or more weld beads 136 in a manner such that said weld beads 136 also develop intermediate metallurgical bonds therebetween.

In the illustrated embodiment, the first additional layer 138 is formed by laying three weld beads over the base layer 132, the second additional layer 140 is formed by laying two weld beads over the first additional layer 138, and the third additional layer 142 is formed by laying a single weld bead over the second additional layer 140. In an embodiment, the third additional layer 142 is the topmost layer of the one or more additional layers 134 of weld beads, and, is also referred to as "apex weld bead layer 142".

In an embodiment, the first additional layer 138 is deposited over the base layer 132 such that the first additional layer 138 may overlap with the base layer 132 to develop a metallurgical bond therebetween. The second additional layer 140 is deposited over the first additional layer 138 such that the second additional layer 140 may overlap with an upper surface 144 of the first additional layer 138 to form a metallurgical bond therebetween. The third additional layer 142 is deposited over the second additional layer 140 such that the third additional layer 142 may overlap with an upper surface 146 of the second additional layer 140 to form a metallurgical bond therebetween.

The base layer 132, the first additional layer 138, the second additional layer 140, and the third additional layer 142 are deposited in a manner to combinedly define a profile that corresponds to the fully penetrated weld joint 124 at the fully penetrated weld joint interface 126. In the illustrated embodiment, the profile converges towards the apex weld bead layer 142 with the apex weld bead layer 142 defining the minimum width of the profile and the base layer 132 defining a maximum width of the profile.

In an exemplary embodiment, the weld beads 136 associated with each of the base layer 132, the first additional layer 138, the second additional layer 140, and the third additional layer 142 may have similar bead geometry throughout the weld joint 124. In some other embodiment, the weld beads 136 associated with each of the base layer 132, the first additional layer 138, the second additional layer 140, and the third additional layer 142 may have dissimilar weld bead geometry.

Figure 6:
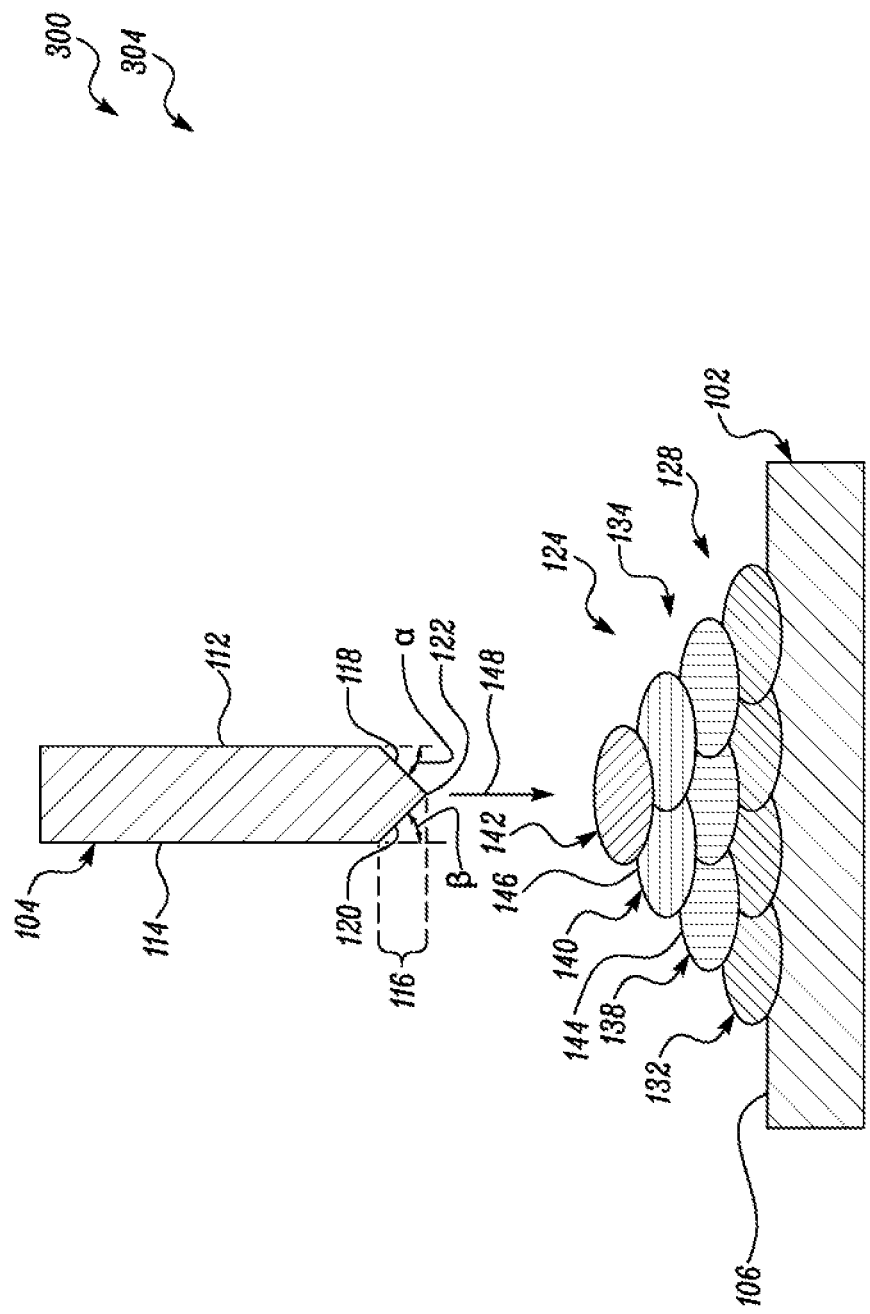
Figure 7:
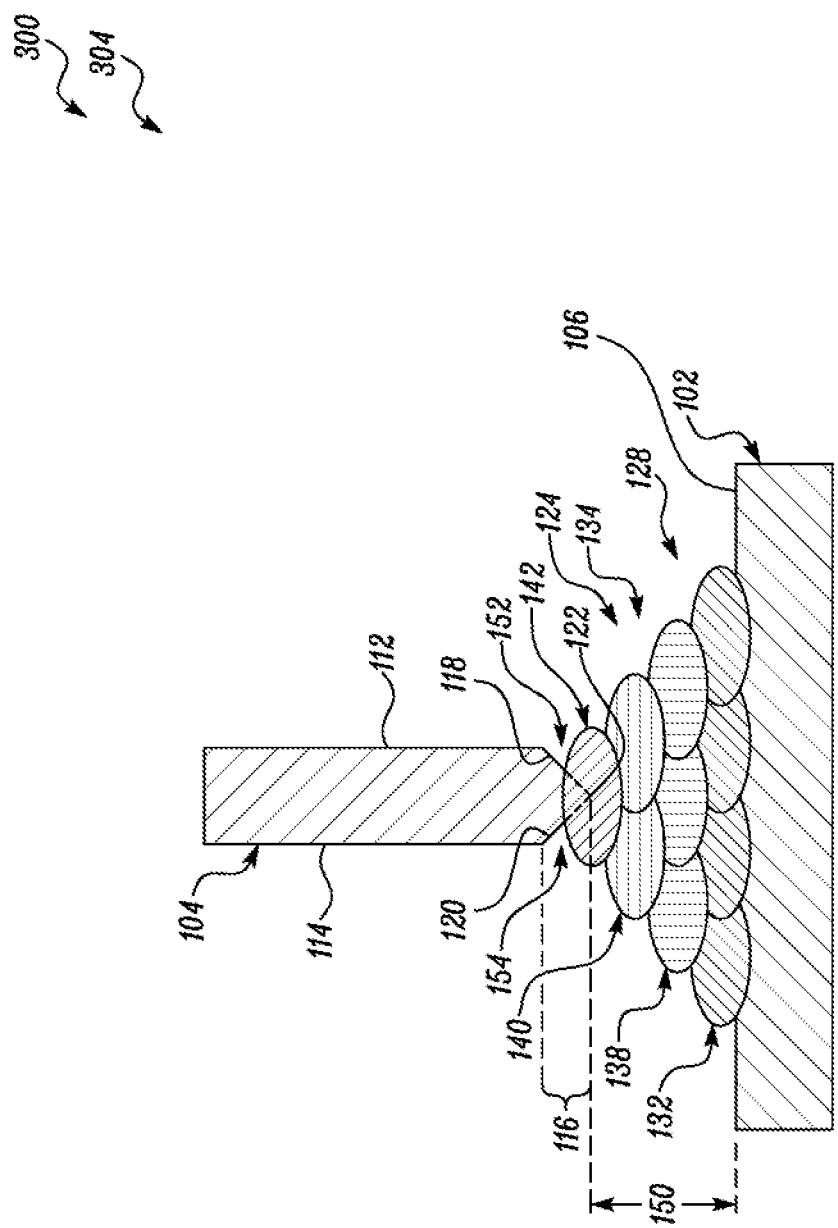

Subsequent to the deposition of the layers 128 of weld beads over the surface 106, the method 300 proceeds to step 304 as shown in FIGS. 6 and 7. At step 304, the second component 104 is placed over the layers 128 of weld beads. The second component 104 is placed over the layers 128 of weld beads such that the second component 104 is in a substantially orthogonal relationship with the first component 102. The term 'substantially orthogonal' is used to account for manufacturing tolerances. More particularly, the second component 104 is placed over the layers 128 of weld beads such that the end 116 develops a metallurgical bond with one or more of the layers 128 of weld beads.

During the placement of the second component 104 over the layers 128 of weld beads, the second component 104 may be moved in a direction (shown as arrow 148 in FIG. 6) towards the apex weld bead layer 142 such that the edge 122 fully penetrates into the apex weld bead layer 142 and the end 116 (i.e., the first beveled surface 118 and the second beveled surface 120) partially penetrates into the apex weld bead layer 142. The portion of the end 116 penetrated into the apex weld bead layer 142 may develop a metallurgical bond with the apex weld bead layer 142.

Effectively, by way of the process, the layers 128 of weld beads may develop a metallurgical bond with the surface 106 and a metallurgical bond with the end 116, and given that the edge 122 may be fully penetrated into the apex weld bead layer 142, the fully penetrated weld joint 124 at the fully penetrated weld joint interface 126 may be defined between the surface 106 of the first component 102 and the end 116 of the second component 104. Also, in such a state, it may be noted that the edge 122 of the end 116 of the second component 104 is placed at an offset 150 from the surface 106 of the first component 102.

As shown in FIG. 7, the second component 104 penetrates into the apex weld bead layer 142 such that a first groove 152 is formed between the first beveled surface 118 and the layers 128 of weld beads, and a second groove 154 is formed between the second beveled surface 120 and the layers 128 of weld beads. In some embodiments, it is possible for the edge 122 and certain portions of the end 116 to penetrate further into one or more of the layers 132, 138, 140, of weld beads that are disposed below the apex weld bead layer 142, and develop a metallurgical bond with one or more of the layers 132, 138, 140 of the weld beads. In some other embodiments, the second component 104 may penetrate into the apex weld bead layer 142 such that the first beveled surface 118 and the second beveled surface 120 may be fully submerged or encapsulated within the apex weld bead layer 142.

Figure 8:
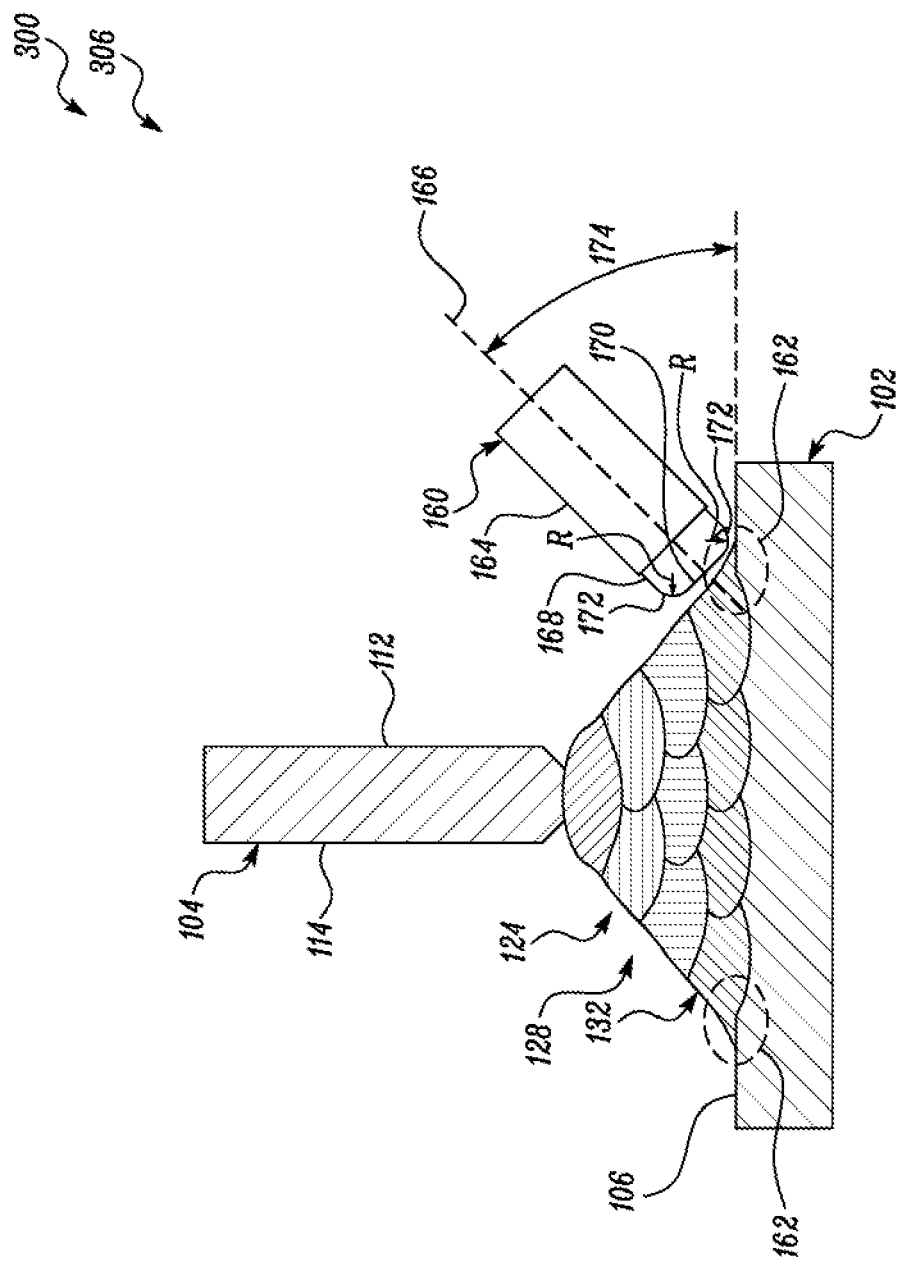

Subsequent to the placement of the second component 104 over the layers 128 of weld beads, the method 300 proceeds to step 306 as shown in FIG. 8. At step 306, compressive residual stress is imparted on the layers 128 of weld beads. The compressive residual stress is imparted to relieve any stress developed during a solidification of the layers 128 of weld beads. In the illustrated embodiment, one or more ultrasonic peening tools (e.g., ultrasonic peening tool 160) are used to induce the compressive residual stress on the layers 128 of weld beads, particularly near stress concentrated areas such as a weld toe region 162 (encircled region as shown in FIG. 8) associated with the base layer 132 of weld beads.

In some embodiments, the ultrasonic peening tool 160 may include a needle pin 164 configured to actuate and perform to-and-fro movements along a longitudinal axis 166 of the ultrasonic peening tool 160. The needle pin 164 may perform the to-and-fro movements to strike and impart compressive residual stress to the layers 128 of weld beads. The needle pin 164 may include an impact head portion 168 which may contact the layers 128 of weld beads to impart the compressive residual stress. The impact head portion 168 may include a flat contact surface 170 with rounded portions 172 of radius 'R' at each end of the flat contact surface 170. Although the illustrated embodiment shows that the ultrasonic peening tool 160 includes only one needle pin 164, it may be contemplated that the ultrasonic peening tool 160 may include any number of needle pins to impart the compressive residual stress on the layers 128 of weld beads, without deviating from the scope of the claimed subject matter.

Further, to impart compressive residual stress to the layers 128 of weld beads, the ultrasonic peening tool 160 may operate at a pre-defined impact angle 174. For the purposes of the present disclosure, the term "impact angle" is defined as an angle, with respect to the surface 106, at which the ultrasonic peening tool 160 may strike the layers 128 of weld beads. In the illustrated embodiment, the ultrasonic peening tool 160 operates at an impact angle 174 of up to 45 degrees with respect to the surface 106.

Figure 9:
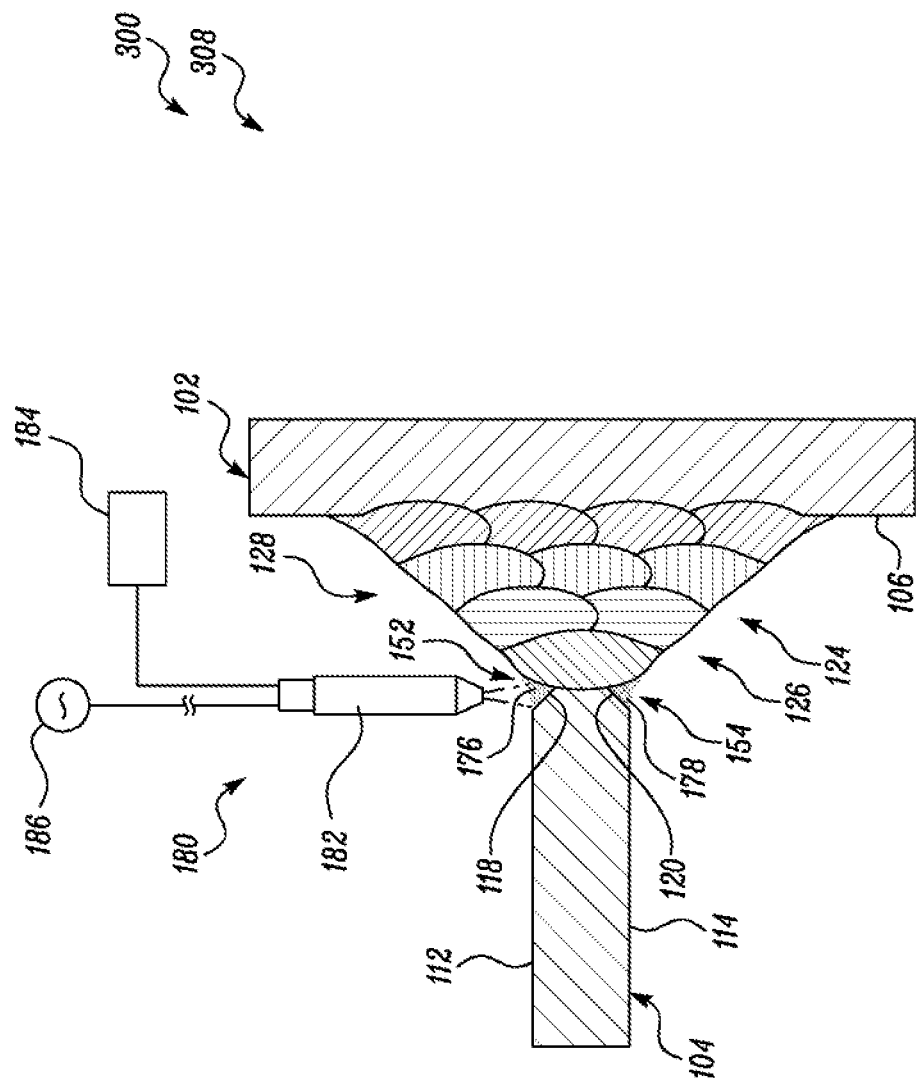

Subsequent to imparting the compressive residual stress on the layers 128 of weld beads, the method 300 proceeds to step 308 as shown in FIG. 9. At step 308, a first weld material layer 176 may be deposited within the first groove 152 defined between the first beveled surface 118 and the layers 128 of weld beads. The first weld material layer 176 may be deposited within the first groove 152 to develop a metallurgical bond with the first beveled surface 118 and one or more of the layers 128 of weld beads. Also, at step 308, a second weld material layer 178 may be deposited within the second groove 154 defined between the second beveled surface 120 and the layers 128 of weld beads. The second weld material layer 178 may be deposited within the second groove 154 to develop a metallurgical bond with the second beveled surface 120 and one or more of the layers 128 of weld beads.

The first weld material layer 176 and the second weld material layer 178 may be deposited by using a welding system 180. In the illustrated embodiment, the welding system may include a welding torch 182, a consumable wire or electrode feeder 184, and a power supply unit 186. The welding system is at least one of a shielded metal arc welding (SMAW) system, a gas tungsten arc welding (GTAW) system, or a tungsten inert gas welding (TIG) system, a gas metal arc welding (GMAW) system, or metal inert gas welding (MIG) system.

In the illustrated embodiment, the first weld material layer 176 and the second weld material layer 178 are deposited after the compressive residual stress is imparted on the layers 128 of weld beads. However, in some embodiments, the first weld material layer 176 and the second weld material layer 178 may be deposited before imparting the compressive residual stress on the layers 128 of weld beads, without deviating from the scope of the claimed subject matter.

INDUSTRIAL APPLICABILITY

Generally, a T-shaped structure is formed by directly contacting two components, placed in substantially orthogonal relationship with each other, and performing a welding operation to deposit filler materials around the contact region to form a weld joint. Such welding operations may introduce a number of defects which may have a decisive influence on the fatigue strength of the weld joint formed. For example, such weld joints may suffer from lack of proper weld penetration and the formation of gaps near a weld root region of the weld joint. Also, such weld joints may suffer from high stress concentration near a weld toe region (e.g., corners) of the weld joint. The presence of gaps near the weld root region and the formation of high stress concentration near the weld toe region may cause development of cracks over a period at both the weld root region and the weld toe region of the weld joint, thus potentially weakening the weld joint.

The T-shaped structure 100 and the method 300 for manufacturing the T-shaped structure 100, as disclosed in the present disclosure, involves joining the first component 102 and the second component 104 with the fully penetrated weld joint 124 (see the fully penetrated weld joint 124 disposed between the components 102, 104, at the interface 126 between the components 102, 104, in FIGS. 1 and 2). The fully penetrated weld joint 124 is formed by depositing the one or more layers 128 of weld beads over the surface 106 of the first component 102; placing the second component 104 over the layers 128 of weld beads such that the end 116 of the second component 104 is at the offset 150 from the surface 106 of the first component 102 to form the first groove 152 (between the first beveled surface 118 and the layers 128 of weld beads) and the second groove 154 (between the second beveled surface 120 and the layers 128 of weld beads); imparting the compressive residual stress to the deposited layers 128 of weld beads; and depositing the first weld material layer 176 within the first groove 152 and the second weld material layer 178 within the second groove 154.

The fully penetrated weld joint 124 formed by the method 300 may significantly reduce or may nearly eliminate the possibility of gap formation near the weld root region of the weld joint 124. Also, stress concentration is moved away from the area near the weld toe region 162 (e.g., corners) of the weld joint 124 to the relatively neutral stress areas (e.g., area near an interface between the first beveled surface 118, the second beveled surface 120, and the apex weld bead layer 142), thereby improving the fatigue strength of the weld joint 124 and increasing the overall structural integrity and life of the T-shaped structure 100. In addition, the bevel weld joint configuration, as disclosed, helps develop a more robust weld joint configuration as compared to weld joint configurations of conventional T-shaped structures. Further, owing to the offset 150 between the first component 102 and the second component 104, the method 300 may provide better accessibility and easier toolpath for the welding system 180 (e.g., to the welding torch 182) to deposit the first weld material layer 176 within the first groove 152 and the second weld material layer 178 within the second groove 154.

It will be apparent to those skilled in the art that various modifications and variations can be made to the method/process of the present disclosure without departing from the scope of the disclosure. Other embodiments will be apparent to those skilled in the art from consideration of the specification and practice of the method/process disclosed herein. It is intended that the specification and examples be considered as exemplary only, with a true scope of the disclosure being indicated by the following claims and their equivalent.

What is claimed is:

1. A method for manufacturing a T-shaped structure, the method comprising:
   depositing one or more layers of weld beads over a portion of a surface of a first component such that the one or more layers of weld beads develop a metallurgical bond with the portion; and
   subsequent to the deposition of the layers, placing an end of a second component over the one or more layers of weld beads such that during placing the end is moved in a direction towards an apex weld bead layer of the one or more layers of weld beads, an edge of the end fully penetrates into the apex weld bead layer, and the end develops a metallurgical bond with the one or more layers of weld beads, wherein
   the one or more layers of weld beads define a fully penetrated weld joint between the end and the portion to form the T-shaped structure, and after the metallurgical bond is developed the edge is offset from the surface of the first component.

2. The method of claim 1, wherein the one or more layers of weld beads are deposited by wire-arc additive manufacturing.

3. The method of claim 1, wherein the end of the second component is placed at an offset from the surface of the first component.

4. The method of claim 1 further comprising imparting, by one or more ultrasonic peening tools, compressive residual stress to the one or more layers of weld beads.

5. The method of claim 4, wherein to impart compressive residual stress to the one or more layers of weld beads, the one or more ultrasonic peening tools operates at an impact angle of up to 45 degrees with respect to the surface of the first component.

6. The method of claim 1, wherein depositing the one or more layers of weld beads include depositing a base layer of weld beads over the portion and successively depositing one or more additional layers of weld beads over the base layer of weld beads up to the apex weld bead layer such that:

the one or more layers of weld beads combinedly define a profile that converges towards the apex weld bead layer, with the apex weld bead layer defining a minimum width of the profile and the base layer defining a maximum width of the profile.

7. The method of claim 6, wherein placing the end of the second component over the one or more layers includes the edge of the second component fully penetrating the apex weld bead layer and the end partially penetrating the apex weld bead layer such that the end develops a metallurgical bond with the apex weld bead layer.

8. The method of claim 1, wherein the second component includes a first side surface and a second side surface opposed to the first side surface, and the end defines a first beveled surface and a second beveled surface respectively extending from the first side surface and the second side surface towards each other.

9. The method of claim 8, wherein the first beveled surface and the second beveled surface converge to meet each other at the edge.

10. The method of claim 8, wherein the first beveled surface defines a bevel angle of up to 45 degrees with respect to the first side surface and the second beveled surface defines a bevel angle of up to 45 degrees with respect to the second side surface.

11. The method of claim 8, wherein by placing the end over the one or more layers of weld beads, a first groove is defined between the first beveled surface and the one or more layers of weld beads and a second groove is defined between the second beveled surface and the one or more layers of weld beads, the method further comprising:

depositing a first weld material layer within the first groove to develop a metallurgical bond with the first beveled surface and the one or more layers of weld beads, and depositing a second weld material layer within the second groove to develop a metallurgical bond with the second beveled surface and the one or more layers of weld beads.

\* \* \* \* \*